(12) United States Patent
Nagamine

(10) Patent No.: US 8,880,823 B2
(45) Date of Patent: Nov. 4, 2014

(54) INFORMATION PROCESSING SYSTEM, INFORMATION PROCESSING APPARATUS, AND NON-TRANSITORY COMPUTER READABLE MEDIUM STORING INFORMATION PROCESSING PROGRAM

(75) Inventor: Takeshi Nagamine, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 152 days.

(21) Appl. No.: 13/587,244

(22) Filed: Aug. 16, 2012

(65) Prior Publication Data

US 2013/0254502 A1 Sep. 26, 2013

(30) Foreign Application Priority Data

Mar. 22, 2012 (JP) ................................. 2012-065132

(51) Int. Cl.
*G06F 12/00* (2006.01)

(52) U.S. Cl.
USPC .......................................... 711/162; 711/170

(58) Field of Classification Search
USPC ................................................ 711/162, 170
See application file for complete search history.

(56) References Cited

FOREIGN PATENT DOCUMENTS

| JP | A-10-257405 | 9/1998 |
|----|-------------|--------|
| JP | A-2009-206841 | 9/2009 |

*Primary Examiner* — Matthew Bradley
(74) *Attorney, Agent, or Firm* — Oliff PLC

(57) ABSTRACT

An information processing system includes a first information processing apparatus, a second information processing apparatus, and a third information processing apparatus, wherein the first information processing apparatus includes: a first reproducing unit reproducing a moving image, a first receiving unit receiving an operation related to the moving image, a first control unit controlling the reproduction of the moving image, a first recording unit recording a time elapsed and a reproduction position, and a first transmitting unit transmitting the recording result, the second information processing apparatus includes: a second receiving unit receiving the recording result, a second generating unit generating a variable for adjusting a reproduction speed, and a second transmitting unit transmitting the variable, and the third information processing apparatus includes: a third receiving unit receiving the variable, a third reproducing unit reproducing the moving image, and a third control unit controlling the reproduction of the moving image.

20 Claims, 11 Drawing Sheets

FIG. 5

| REPRODUCTION POSITION (SECOND) | 0 | 1 | 2 | 3 | ... | 80 | 81 | 82 | ... | 88 | 89 | 90 | 91 | ... | 118 | 119 | 120 |
|---|---|---|---|---|---|---|---|---|---|---|---|---|---|---|---|---|---|
| WEIGHT | 1 | 1 | 1 | 1 | | 40 | 30 | 30 | | 8 | 8 | 10 | 10 | | 0.8 | 0.8 | 0.8 |

FIG. 6

| 610 | 620 | 630 | 640 | 650 | 660 | 600 |
|---|---|---|---|---|---|---|
| MOVING IMAGE ID | MOVING IMAGE NAME | WEIGHT TABLE ID | NUMBER OF REPRODUCTIONS | REPRODUCTION USER ID | HISTORY TABLE | ... |
| | | | | | | |

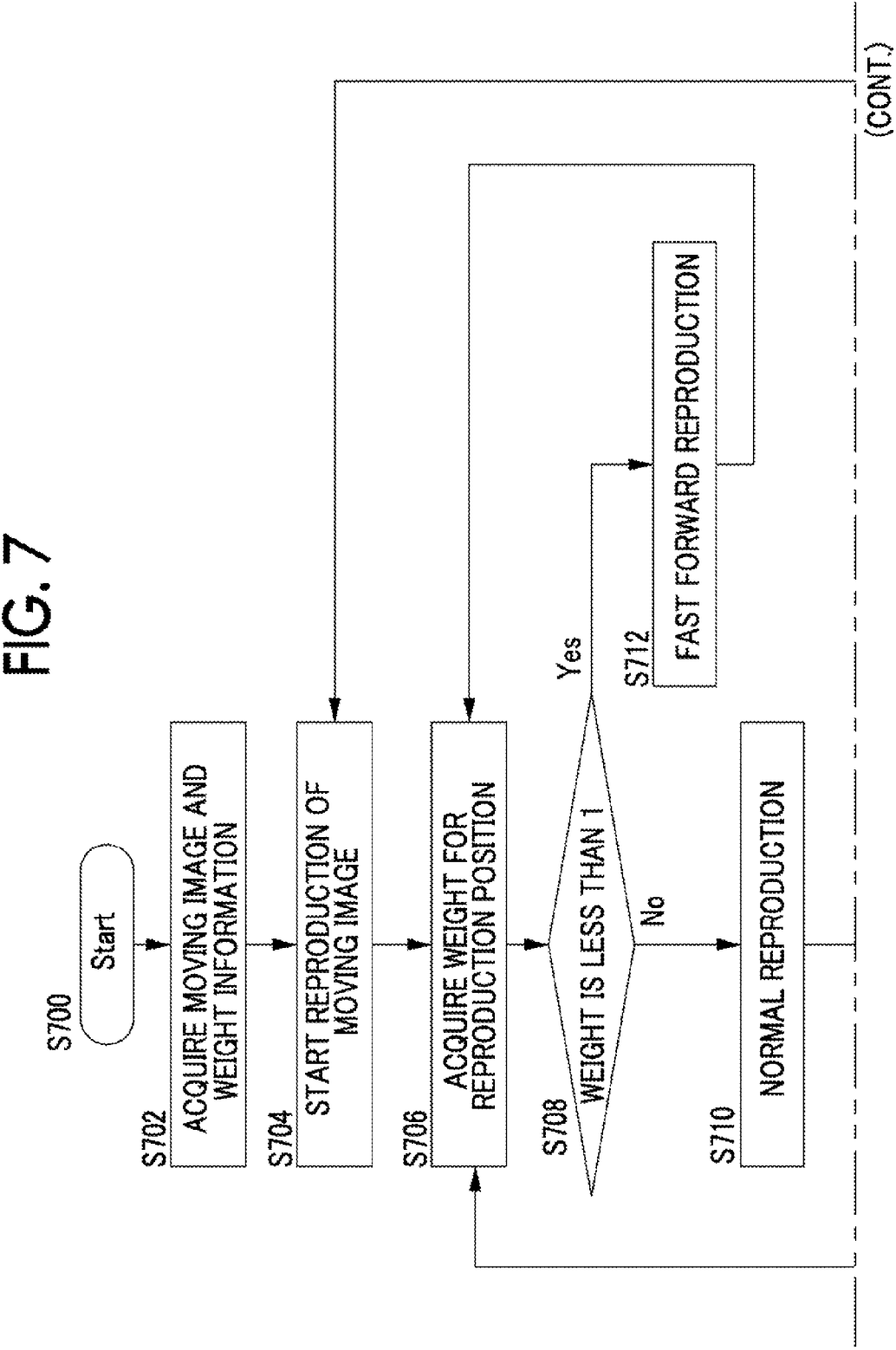

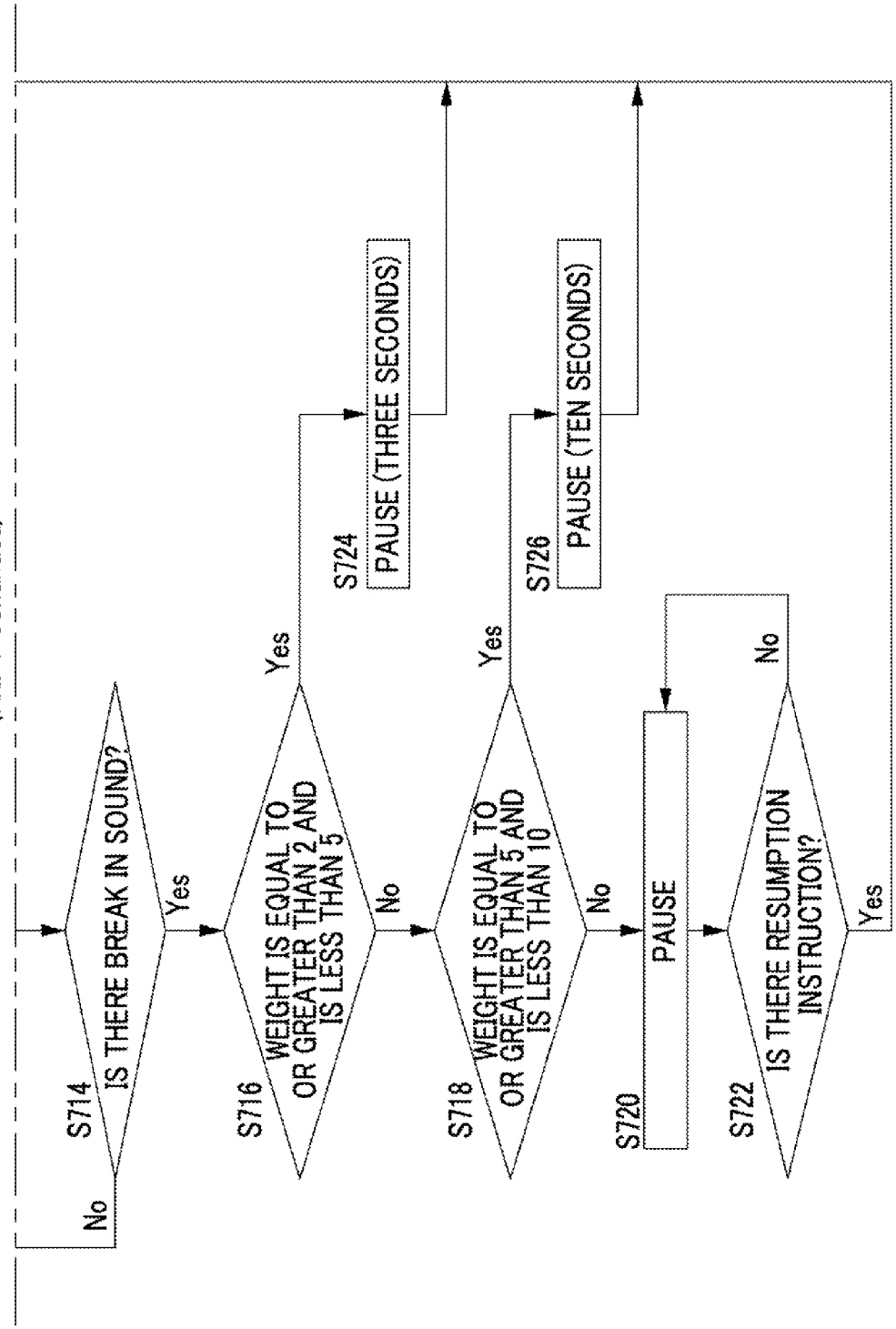

FIG. 8

| WEIGHT | REPRODUCTION METHOD |
|---|---|
| LESS THAN 1 | FAST FORWARD REPRODUCTION (FOR EXAMPLE, 1.3 TIMES) |
| EQUAL TO OR GREATER THAN 1 AND LESS THAN 2 | REPRODUCTION AT NORMAL SPEED |
| EQUAL TO OR GREATER THAN 2 AND LESS THAN 5 | PAUSE AT BREAK IN SOUND (FOR EXAMPLE, THREE SECONDS) |
| EQUAL TO OR GREATER THAN 5 AND LESS THAN 10 | PAUSE AT BREAK IN SOUND (FOR EXAMPLE, TEN SECONDS) |
| EQUAL TO OR GREATER THAN 10 | PAUSE AT BREAK IN SOUND UNTIL INSTRUCTION IS RECEIVED FROM USER |

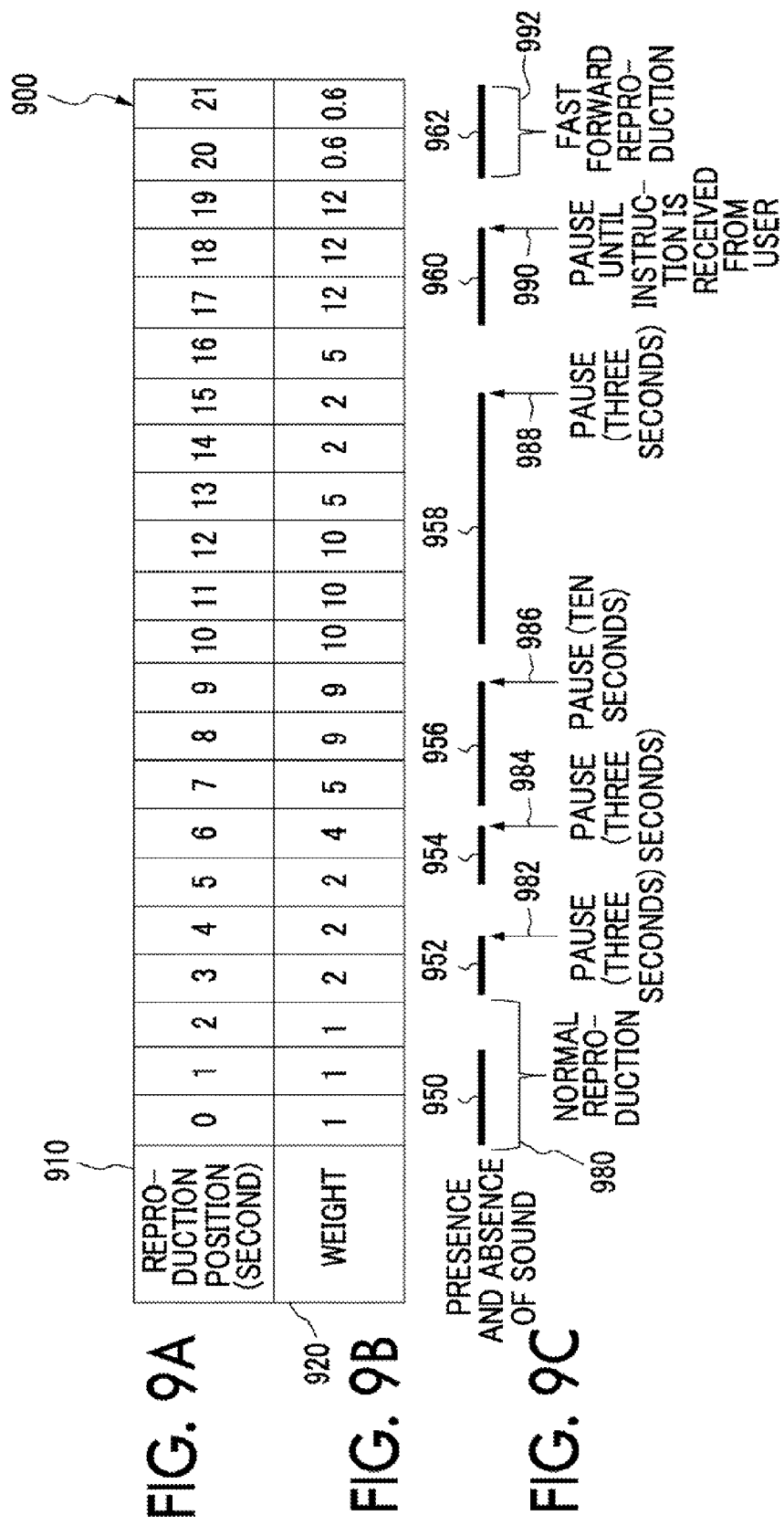

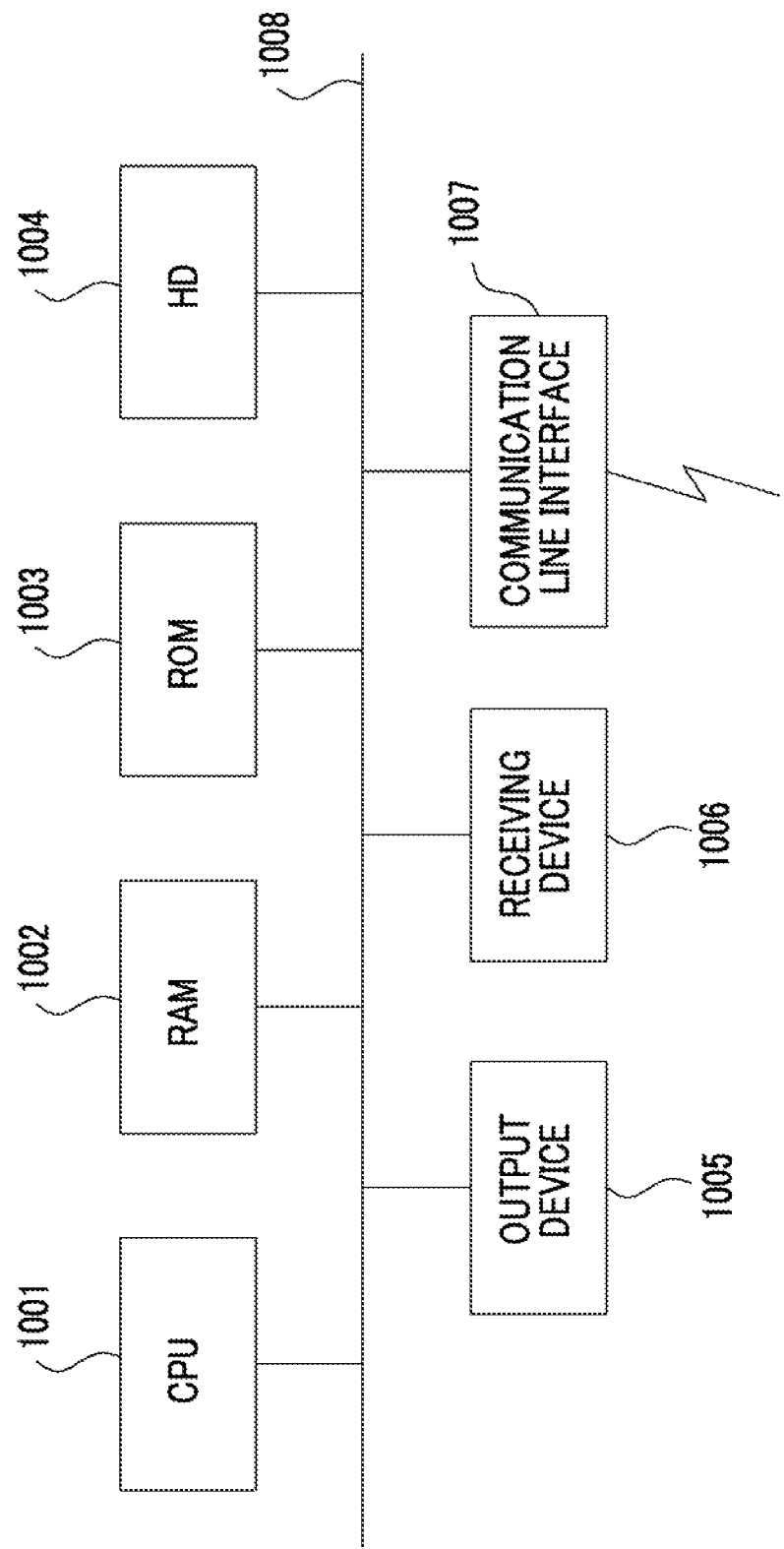

INFORMATION PROCESSING SYSTEM, INFORMATION PROCESSING APPARATUS, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2012-065132 filed Mar. 22, 2012.

BACKGROUND

Technical Field

The present invention relates to an information processing system, an information processing apparatus, and a non-transitory computer readable medium storing an information processing program.

SUMMARY

According to an aspect of the invention, there is provided an information processing system including: a first information processing apparatus; a second information processing apparatus; and a third information processing apparatus, wherein the first information processing apparatus includes: a first reproducing unit that performs a process of reproducing a moving image; a first receiving unit that receives an operation related to the moving image which is reproduced by the first reproducing unit; a first control unit that controls the moving image reproduction process of the first reproducing unit on the basis of the operation received by the first receiving unit; a first recording unit that records a time elapsed from the start of the moving image reproduction process of the first reproducing unit and a reproduction position in the moving image by the reproduction process controlled by the first control unit so as to correspond to each other; and a first transmitting unit that transmits the recording result of the first recording unit to the second information processing apparatus, the second information processing apparatus includes: a second receiving unit that receives the recording result transmitted by the first transmitting unit of the first information processing apparatus; a second generating unit that generates a variable for adjusting a reproduction speed of the moving image, on the basis of the recording result which is obtained by performing the reproduction process on the same moving image plural times and is received by the second receiving unit; and a second transmitting unit that transmits the variable generated by the second generating unit to the third information processing apparatus, and the third information processing apparatus includes: a third receiving unit that receives the variable transmitted by the second transmitting unit of the second information processing apparatus; a third reproducing unit that performs a process of reproducing the moving image; and a third control unit that controls the moving image reproduction process of the third reproducing unit on the basis of the variable received by the third receiving unit.

BRIEF DESCRIPTION OF THE DRAWINGS

Exemplary embodiments of the present invention will be described in detail based on the following figures, wherein:

FIG. 5 is a diagram illustrating an example of the data structure of a weight table;

FIG. 6 is a diagram illustrating an example of the data structure of a moving image management table;

FIG. 7 is a flowchart illustrating an example of a process (an example of a reproduction process) according to this exemplary embodiment;

FIG. 8 is a diagram illustrating an example of the data structure of a weight and reproduction method correspondence table;

FIG. 9 is a diagram illustrating an example of a process (an example of a reproduction process) according to this exemplary embodiment; and FIG. 10 is a block diagram illustrating an example of the hardware structure of a computer that implements this exemplary embodiment.

DETAILED DESCRIPTION

Hereinafter an exemplary embodiment of the invention will be described with reference to the accompanying drawings.

Figure 1:
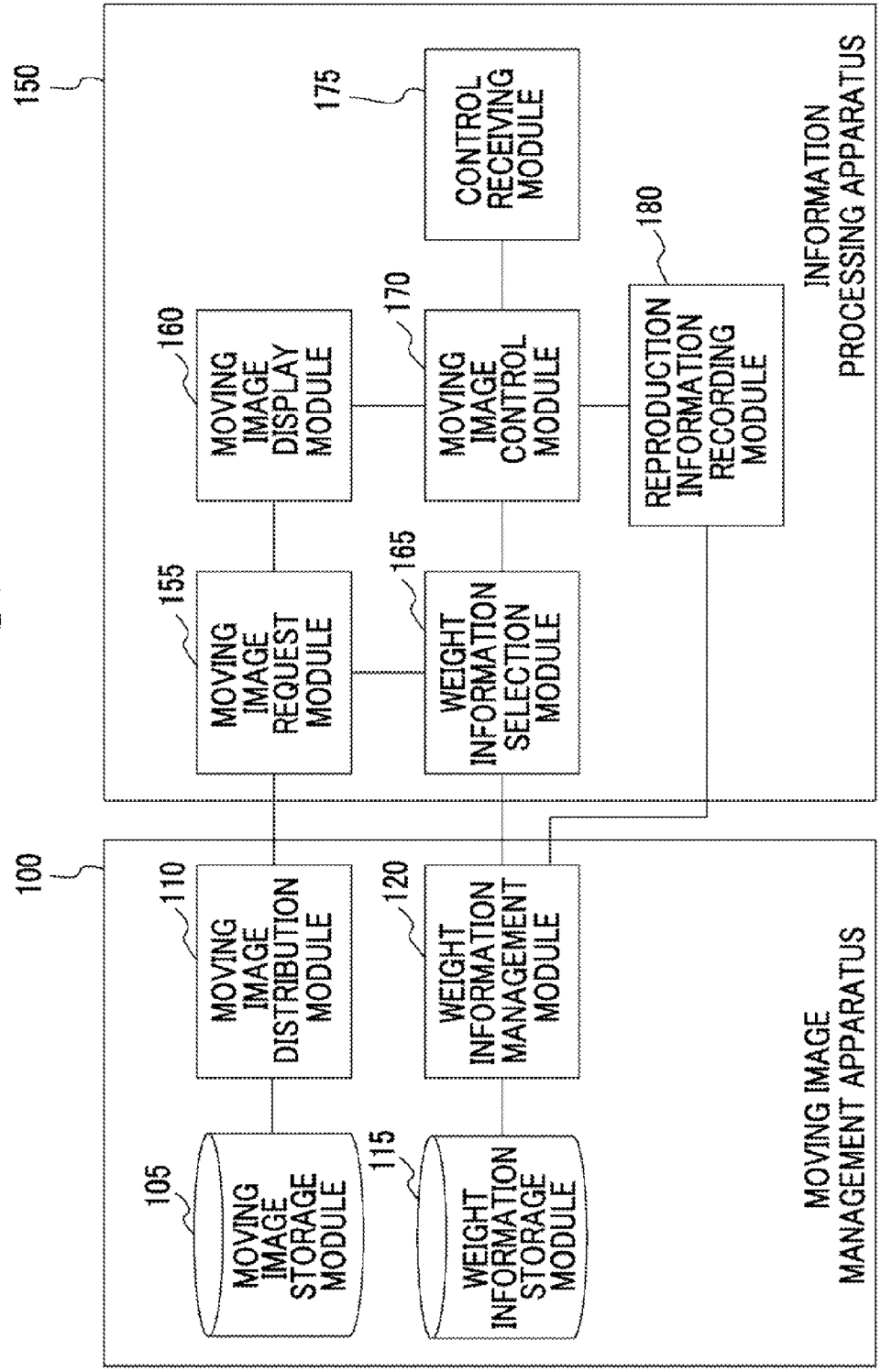
FIG. 1 is a conceptual module configuration diagram illustrating an example of a structure according to an exemplary embodiment.

FIG. 1 is a conceptual module configuration diagram illustrating an example of a structure according to this exemplary embodiment.

The term "module" refers generally to a component, such as logically separable software (computer program) and hardware. Therefore, a module in this exemplary embodiment indicates not only a module in a computer program but also a module in a hardware structure. Thus, this exemplary embodiment relates to a computer program (including a program which causes a computer to perform each process, a program which causes a computer to function as each unit, and a program which causes a computer to implement the functions of each unit) that causes a computer to function as modules, system, and a method. For convenience of description, as used herein, "store," "be stored", or the equivalents thereof mean that a computer program is stored in a storage device or is controlled such that it is stored in a storage device when the exemplary embodiment relates to the computer program. The module may be in one-to-one correspondence with a function. When modules are mounted, one module may be configured as one program, plural modules may be formed by one program, or one module may be formed by plural programs. Plural modules may be implemented by one computer, or one module may be implemented by plural computers in distributed or parallel environments. One module may include other modules. Hereinafter, the term "connection" includes physical connection and logical connection (for example, the transmission and reception of data, instructions, and the reference relationship between data). The term "predetermined" means being predetermined prior to a target process. The term "predetermined" includes not only determination before a process according to the exemplary embodiment starts but also determination according to situations and conditions at that time or situations and conditions up to that time before a target process after the process according to the exemplary embodiment starts. When there are plural "predetermined values", the predetermined values may be different from each other or two or more values (of course, including all values) may be equal to each other. In addition, the sentence "when A is satisfied, B is performed" means that "if it is determined that A is satisfied, B is performed". However, a case in which it is not necessary to determine whether A is satisfied is excluded.

The term "system" or "apparatus" includes a structure including, for example, one computer, hardware, and a device and a structure in which, for example, plural computers, hardware, and devices are connected to each other by a communication unit, such as a network (including one-to-one correspondence communication connection). In the specification, "apparatus" is synonymous with "system." Of course, the "system" does not include anything that is merely a social "structure" (social system) that includes artificial decisions.

For each process by each module or each process when plural processes are performed in a module, target information is read from a storage device and is then processed and the process result is written to the storage device. Therefore, in some cases, the description of reading information from the storage device before the process and writing the process result to the storage device after the process is omitted. The storage device may include, for example, a hard disk, a RAM (Random Access Memory), an external storage medium, a storage device through a communication line, and a register in a CPU (Central Processing Unit).

An information processing system according to this exemplary embodiment performs a moving image reproduction process and includes a moving image management apparatus 100 and an information processing apparatus 150 as shown in FIG. 1. The moving image management apparatus 100 and the information processing apparatus 150 are connected so as to communicate with each other. Plural information processing apparatuses 150 may be provided.

The moving image management apparatus 100 includes a moving image storage module 105, a moving image distribution module 110, a weight information storage module 115, and a weight information management module 120.

The moving image storage module 105 is connected to the moving image distribution module 110. The moving image storage module 105 is accessed by the moving image distribution module 110 and stores reproducible moving images.

The moving image distribution module 110 is connected to the moving image storage module 105 and a moving image request module 155. The moving image distribution module 110 reads a moving image from the moving image storage module 105 and transmits the read moving image to the information processing apparatus 150 in response to a request from the moving image request module 155 of the information processing apparatus 150.

The weight information storage module 115 is connected to the weight information management module 120. The weight information storage module 115 is accessed by the weight information management module 120 and stores a variable (hereinafter, also referred to as a weight or weight information) generated by the weight information management module 120. In addition, the weight information storage module 115 may store the recording result transmitted by a reproduction information recording module 180 of the information processing apparatus 150.

The weight information management module 120 is connected to the weight information storage module 115, a weight information selection module 165, and the reproduction information recording module 180. The weight information management module 120 receives the recording result transmitted by the reproduction information recording module 180 of the information processing apparatus 150. The recording result may be stored in the weight information storage module 115.

On the basis of the recording result when a reproduction process is performed on the same moving image plural times, the weight information management module 120 generates a variable for adjusting the reproduction speed of the moving image. Specifically, the weight information management module 120 generates a weight table 500 shown in FIG. 5, which will be described below. The term "plural reproduction processes on the same moving image" may include the following cases: a case in which the reproduction process is performed on the same moving image plural times; a case in which the same moving image is reproduced by the same viewer plural times; and a case in which the same moving image is reproduced by plural different viewers. Then, the weight information management module 120 stores the generated variable in the weight information storage module 115.

Then, the weight information management module 120 reads the variable from the weight information storage module 115 and transmits the read variable to the weight information selection module 165, in response to a request from the weight information selection module 165 of the information processing apparatus 150. In addition, the weight information management module 120 may perform a smoothing process on the variables arranged before and after a reproduction position.

When the moving image reproducing operation is paused and the pause time is equal to or greater than a predetermined value, the weight information management module 120 may not perform the variable generating process for the pause time.

The information processing apparatus 150 includes the moving image request module 155, a moving image display module 160, the weight information selection module 165, a moving image control module 17 0, a control receiving module 175, and the reproduction information recording module 180.

The moving image request module 155 is connected to the moving image distribution module 110, the moving image display module 160, and the weight information selection module 165. The moving image request module 155 requests the moving image distribution module 110 of the moving image management apparatus 100 to transmit a moving image and receives the requested moving image from the moving image distribution module 110 of the moving image management apparatus 100. Then, the moving image request module 155 transmits the moving image to the moving image display module 160. In addition, the moving image request module 155 requests the weight information selection module 165 to acquire a variable corresponding to the moving image. The moving image to be requested may be determined by the operation of the user (viewer) of the information processing apparatus 150 or it may be predetermined.

The moving image display module 160 is connected to the moving image request module 155 and the moving image control module 170. The moving image display module 160 reproduces the moving image received by the moving image request module 155. That is, the moving image display module 160 displays the moving image on a display, such as a liquid crystal display, provided in the moving image management apparatus 100. In addition, in the reproduction process, the moving image display module 160 is under the control of the moving image control module 170.

The weight information selection module 165 is connected to the weight information management module 120, the moving image request module 155, and the moving image control module 170. The weight information selection module 165 receives the variable transmitted by the weight information management module 120 of the moving image management apparatus 100. The variable corresponds to the moving image (the moving image to be reproduced by the moving image display module 160) requested by the moving image request module 155. Then, the weight information selection module 165 transmits the received variable to the moving image control module 170.

The moving image control module 170 is connected to the moving image display module 160, the weight information selection module 165, the control receiving module 175, and the reproduction information recording module 180. The moving image control module 170 controls the reproduction of the moving image by the moving image display module 160 according to the operation received by the control, receiving module 175. Alternatively, when receiving the variable from the weight information selection module 165, the moving image control module 170 controls the reproduction of the moving image by the moving image display module 160 on the basis of the variable. In addition, the moving image control module 170 may adjust the speed of the reproduction process on the basis of a break in sound in the moving image. When the variable is equal to or greater than a predetermined value, the moving image control module 170 may adjust the speed of the reproducing process, without being based on the break in sound in the moving image.

The reproduction information recording module 180 transmits the type of control (for example, reproduction, stop, rewind, pause, skip, and high-speed reproduction (for example, double-speed reproduction)) and the reproduction time of the moving image.

The control receiving module 175 is connected to the moving image control module 170. The control receiving module 175 receives an operation related to the moving image reproduced by the moving image display module 160. The operation is a user operation for, for example, a keyboard, a mouse, and a touch panel and the type of operation includes, for example, reproduction, stop, rewind, pause, skip, and high-speed reproduction (for example, double-speed reproduction).

The reproduction information recording module 180 is connected to the weight information management module 120 and the moving image control module 170. The reproduction information recording module 180 records the time elapsed from the start of the reproduction of the moving image by the moving image display module 160 and the reproduction position in the moving image by the reproducing process controlled by the moving image control module 170 so as to correspond to each other. Specifically, the reproduction information recording module 180 generates a history table 400 shown in FIG. 4, which will be described below, and records the history table 400. Then, the reproduction information recording module 180 transmits the recording result to the weight information management module 120 of the moving image management apparatus 100. In addition, when the operation received by the control receiving module 175 is a pause and the pause time is equal to or more than a predetermined value, the reproduction information recording module 180 may not perform recording during the pause.

The reproduction information recording module 180 may perform a variable generating process in the reproducing process performed by the information processing apparatus 150 and transmit the result to the weight information management module 120. In this case, the weight information management module 120 may add the received variable and the variable which corresponds to the same moving image and has been stored in the weight information storage module 115 and store the sum variable in the weight information storage module 115.

The information processing apparatus 150 may be configured by the moving image request module 155, the moving image display module 160, the moving image control module 170, the control receiving module 175, and the reproduction information recording module 180. In this case, the information processing apparatus 150 performs only a reproduction process and a history collecting process (mainly the processes performed by the reproduction information recording module 180). In addition, the information processing apparatus 150 may be configured by the moving image request module 155, the moving image display module 160, the weight information selection module 165, the moving image control module 170 and the control receiving module 175. In the case, the information processing apparatus 150 performs only the reproduction process based on the variable. The information processing apparatus 150 may include the moving image request module 155, the moving image display module 160, the weight information selection module 165, the moving image control module 170, the control receiving module 175, and the reproduction information recording module 180 and perform only the reproduction process and the history collection process or only the reproduction process based on the variable. In addition, the information processing apparatus 150 may perform only the history collection process and the reproduction process based on the variable, or it may include the reproduction process based on the variable as a history collection target.

Figure 2:
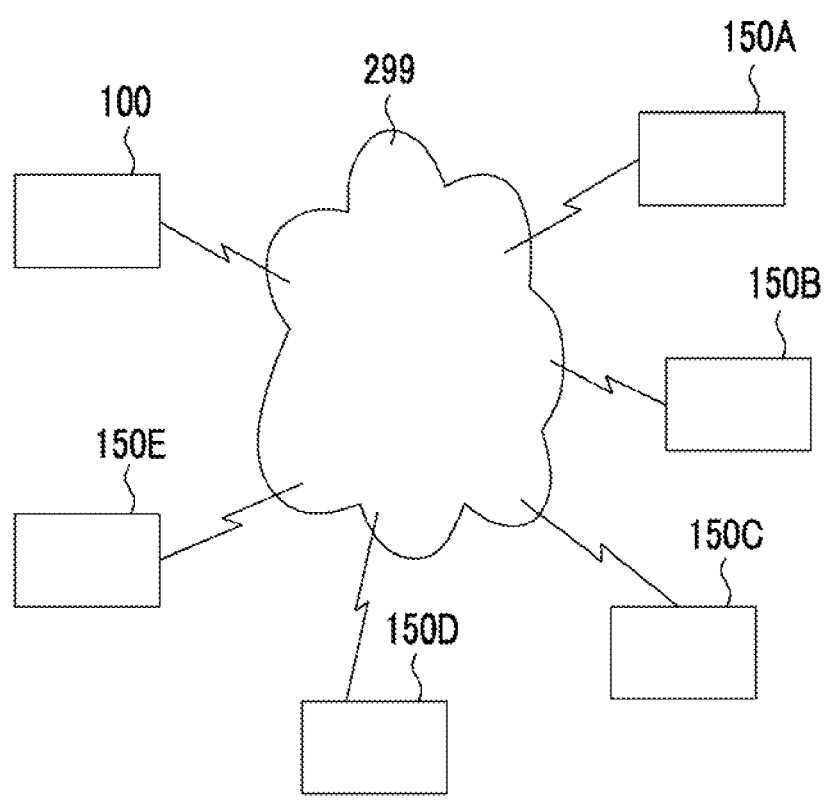
FIG. 2 is a diagram illustrating an example of the structure of a system when this exemplary embodiment is implemented.

FIG. 2 is a diagram illustrating an example of the structure of the system when this exemplary embodiment is implemented.

The moving image management apparatus 100 and information processing apparatuses 150A to 150E are connected to each other through a communication line 299. In this exemplary embodiment, five information processing apparatuses 150 are shown, but one or more information processing apparatus may be provided.

An example of the structure of the system is used for learning when a lecture scene is captured as a moving image and is viewed later. In addition, the moving image is distributed as a TV image or it is distributed through the Internet such that the learner views the moving image on a TV or a PC (information processing apparatus 150).

In the case of the moving image, the learner needs to understand the moving image according to the reproduction speed of the moving image, unlike learning using books. When the speed at which the learner understands the moving image does not follow the reproduction speed of the moving image, the learner pauses or rewinds the moving image to control the moving image, thereby gaining time to consider or make notes. However, the control of the moving image hinders the understanding of the learner.

For example, the same moving image is reproduced by the information processing apparatuses 150A to 150D and the reproduction history is collected by the moving image management apparatus 100. When the information processing apparatus 150E reproduces the same moving image, the reproduction speed of the moving image is adjusted on the basis of the previous reproduction history and then the reproduction process is performed. For example, it takes a lot of time to understand the content of the moving image at a point where the moving image has been paused or repeatedly reproduced in the past. The reproduction operation is recorded and collected and the reproduction speed is changed at the point where it takes a lot of time to understand the moving image.

The processes according to this exemplary embodiment are mainly classified into a history collection process and a reproduction process based on the history.

Figure 3:
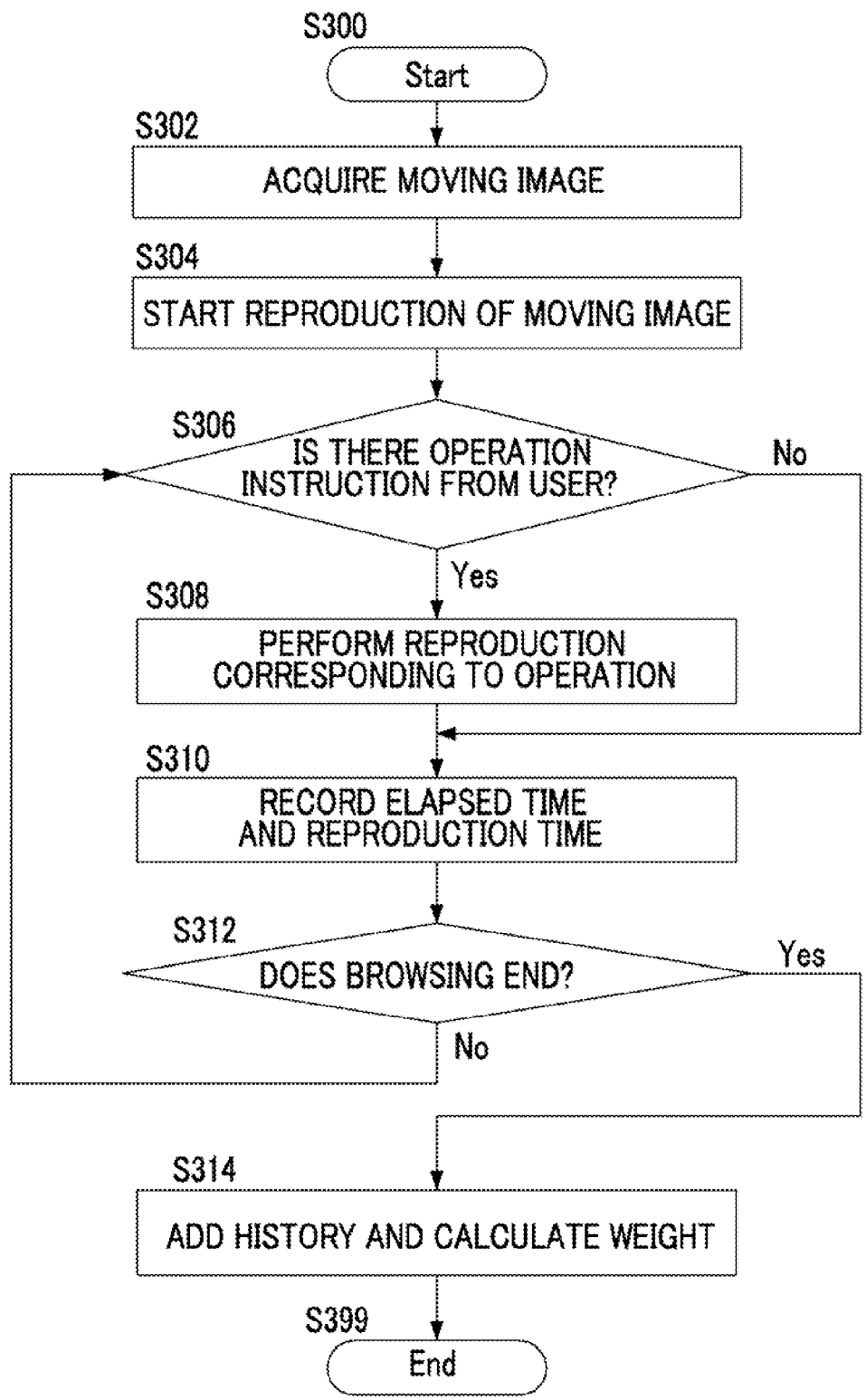
FIG. 3 is a flowchart illustrating an example of a process (an example of a history collection process) according to this exemplary embodiment.

FIG. 3 is a flowchart illustrating an example of the process (an example of the history collection process) according to this exemplary embodiment.

In Step S302, the moving image request module 155 acquires a moving image from the moving image management apparatus 100. As an acquisition method, in this exemplary embodiment, a moving image ID (IDentification), which is information for uniquely identifying the moving image, is notified to the moving image management apparatus 100.

The moving image distribution module 110 receives a request for the moving image ID from the moving image request module 155, reads a moving image corresponding to the moving image ID from the moving image storage module 105, and transmits the read moving image to the moving image request module 155 of the information processing apparatus 150.

In Step S304, the moving image control module 170 performs control such that the moving image display module 160 starts the reproduction of the moving image.

In Step S306, the control receiving module 175 determines whether there is an operation instruction from the user. When it is determined that there is an operation instruction from the user, the process returns to Step S308. In the other cases, the process proceeds to Step S310.

In Step S308, the moving image control module 170 performs reproduction corresponding to the operation. When the moving image display module 160 starts the reproduction of the moving image and the control receiving module 175 detects the operation instruction (for example, pause or rewind) from the user, the moving image control module 170 controls the moving image display module 160 such that the moving image corresponding to the operation instruction is reproduced.

Figure 4:
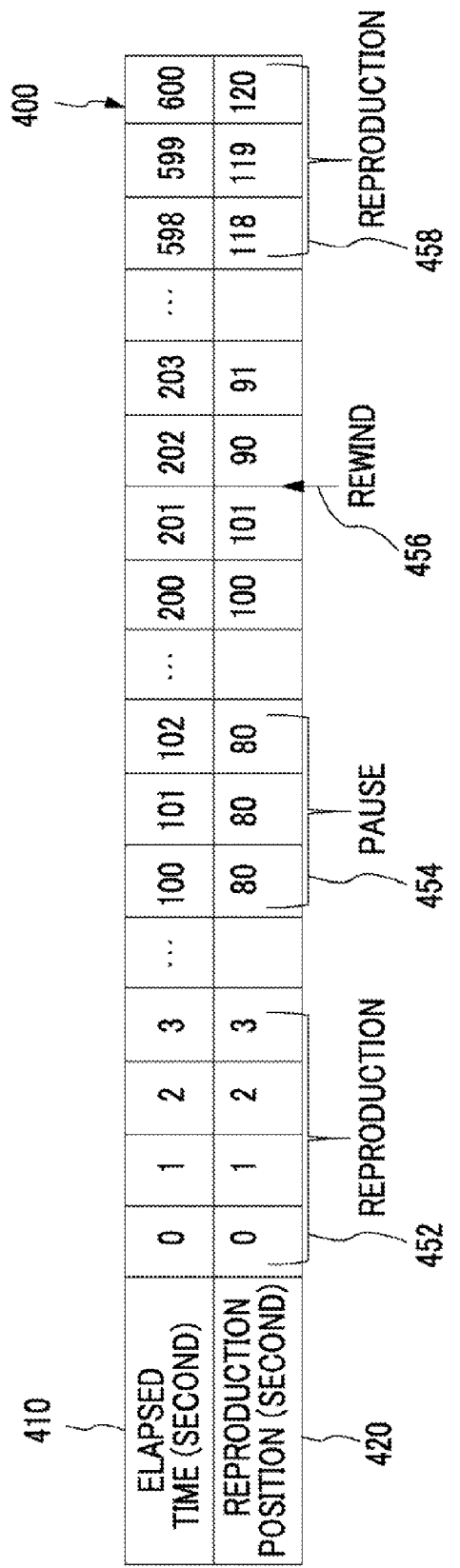
FIG. 4 is a diagram illustrating an example of the data structure of a history table.

In Step S310, the reproduction information recording module 180 records the elapsed time and the reproduction time. The reproduction information recording module 180 records the time elapsed from the start of the reproduction and the reproduction time of the moving image. For example, it is assumed that this loop is repeated every second. Then, for example, the history table 400 is generated. FIG. 4 shows an example of the data structure of the history table 400. The history table 400 includes an elapsed time field 410 and a reproduction position field 420. The elapsed time field 410 stores the time (A) elapsed from the reproduction of the moving image. The elapsed time (A) is the time (real time) elapsed from the actual start of the reproduction of the moving image. Therefore, even when an operation, such as rewind or pause, is performed, the time (A) elapses during the operation. The reproduction position field 420 stores the reproduction position (B) of the moving image at the elapsed time (A). The reproduction position (B) is a reproduction position in the moving image and indicates the time when the moving image is simply reproduced. The reproduction position (B) corresponds to the number of frames. Therefore, when there is no operation for the moving image, the elapsed time (A) is identical to the reproduction position (B). When there is a pause operation, the reproduction position (B) is fixed (of course, the time (A) elapses during the pause operation) during the pause operation. When there is a fast-forward operation, the reproduction position (B) advances faster than the rate at which the time (A) elapses.

Specifically, when the user reproduces a given moving image, the time (elapsed time (A)) elapsed after the user views the moving image and the reproduction time (reproduction position (B)) of the moving image are recorded. The user controls the moving image reproduction, process (for example, reproduction, pause, and skip) to change the reproduction time of the moving image. In this example, the history is acquired every second. Since the elapsed time (A) is the actual lapse of time, it is added from the start of the reproduction of the moving image. The reproduction position (B) is added during normal reproduction, but is not added during pause. In addition, during a rewind operation, the reproduction position is subtracted by a value corresponding to rewind.

For example, the history table 400 shown in FIG. 4 shows the history. When the elapsed time is from 0 to 3 seconds, reproduction 452 is performed and the elapsed time (A) is identical to the reproduction position (B) during the reproduction 452. When the elapsed time is from 100 to 102 seconds, pause 454 is performed, the elapsed time (A) increases, and the reproduction position (B) is a fixed value. When the elapsed time is between 201 seconds and 202 seconds, rewind 456 is performed and the reproduction position (B) returns from "101 seconds" to "90 seconds". When the elapsed time is from 598 to 600 seconds, reproduction 458 is performed, and the speed (progress) of the elapsed time (A) is equal to that of the reproduction position (B).

In Step S312, the moving image control module 170 determines whether browsing ends. When browsing ends, the process proceeds to Step S314. In the other cases, (when browsing does not end), the process returns to Step S306 (monitoring of an operation instruction from the user).

In Step S314, the weight information management module 120 adds the history and calculates a weight. When browsing ends, the weight information management module 120 transmits the history (in the above-mentioned example, the history table 400) to the moving image management apparatus 100, adds the history in the corresponding moving image, and performs weighting (a process of generating a variable for adjusting the speed when the moving image is reproduced). For example, the weight information management module 120 generates a weight table 500. FIG. 5 is a diagram illustrating an example of the data structure of the weight table 500. The weight table 500 includes a reproduction position field 510 and a weight field 520. The reproduction position field 510 stores the reproduction position (B). The reproduction position field 510 corresponds to the reproduction position field 420 of the history table 400 shown in FIG. 4. The weight field 520 stores a value obtained by dividing the number of times a numerical value appears in the reproduction position field 420 of the history table 400 (plural history tables 400) in each reproduction operation by the number of reproductions.

In the collected history, the display time (display time by reproduction or pause) is added at each reproduction position and the added value is divided by the number of reproductions to calculate the weight. For example, FIG. 5 shows an example of the integration of the histories corresponding to 10 persons. Assuming that each person performs normal reproduction only once at the reproduction positions 0 to 3, the weight is 1. During a pause operation, the weight increases (the weight is 40 at a reproduction position of 80 seconds). That is, ten viewers view a portion corresponding to the reproduction position (B) for a total of 400 seconds. When there is a portion which is not viewed by the viewers, the weight is less than 1 as shown in the vicinity of a reproduction position (B) of 118 seconds.

In some cases, a pause operation is performed for resting. Therefore, when the pause time is equal to or more than a predetermined threshold value (for example, 30 seconds), the weighting process may not be performed on the pause operation. In addition, in Step S310, the elapsed time and the reproduction time may not be recorded during the pause operation.

The weight information management module 120 of the moving image management apparatus 100 manages, for example, a moving image management table 600. The moving image management table 600 is stored in the weight information storage module 115. FIG. 6 is a diagram illustrating an example of the data structure of the moving image management table 600. The moving image management table 600 includes a moving image ID field 610, a moving image name field 620, a weight table ID field 630, a reproduction number field 640, a reproduction user ID field 650, and a history table field 660. The moving image ID field 610 stores a moving image ID. The moving image name field 620 stores the name of the moving image. The operator of the information processing apparatus 150 may designate the moving image to be reproduced using the moving image name. The weight table ID field 630 stores, for example, the weight table 500 associated with the moving image. The weight table ID field 630 may store the address stored in the weight table 500 or the content of the weight table 500. The reproduction number field 640 stores the number of times the moving image is reproduced. The sets of the reproduction user ID fields 650 and the history table fields 660 which are equal to a value stored in the reproduction number field 640 follow the reproduction number field 640. The reproduction user ID field 650 stores a user ID, which is information for uniquely identifying the user who reproduces the moving image, specifically, the moving image in this exemplary embodiment. The history table field 660 stores, for example, the history table 400 when the moving image is reproduced by the user. The history table field 660 may store the address stored in the history table 400 or the content of the history table 400.

FIG. 7 is a flowchart illustrating an example of the process (an example of the reproduction process) according to this exemplary embodiment.

In Step S705, the moving image request module 155 acquires a moving image. The weight information selection module 165 acquires weight information corresponding to the moving image. The weight information selection module 165 acquires the moving image and the corresponding weight information from the moving image management apparatus 100. As the acquisition method, the weight information selection module 165 notifies the moving image management apparatus 100 of the moving image ID. For the moving image, Step S702 is the same as Step S302 in the flowchart shown in FIG. 3. For the acquisition of the weight information (for example, the weight table 500), the weight information select ion module 165 acquires the moving image ID of the moving image to be reproduced from the moving image request module 155 and transmits the moving image ID to the weight information management module 120 of the moving image management apparatus 100. Then, the weight information management module 120 reads the weight table 500 corresponding to the moving image ID from the weight information storage module 115 using, for example, the above-mentioned moving image management table 600 and transmits the weight table 500 to the weight information selection module 165 of the information processing apparatus 150.

When receiving the weight table 500, the weight information selection module 165 transmits the weight table 500 to the moving image control module 170.

In Step S704, the moving image control module 170 starts the reproduction of the moving image. Step S704 is the same as Step S304 in the flowchart shown in FIG. 3.

In Step S706, when the reproduction of the moving image starts, the moving image control module 170 acquires a weight at the reproduction position.

In Step S708, the moving image control module 170 determines whether the weight is less than 1. When the weight is less than 1, the process proceeds to Step S712. In the other cases, the process proceeds to Step S710.

In Step S710, the moving image control module 170 performs normal reproduction when the weight is equal to or greater than 1. When there is a break in sound, the moving image control module 170 acquires a weight at the reproduction position.

In Step S712, the moving image control module 170 performs fast-forward reproduction. When the weight is less than 1, the moving image control module 170 performs the fast-forward reproduction.

In Step S714, the moving image control module 170 determines whether there is a break in sound. When there is a break in sound, the process proceeds to Step S716. In the other cases, the process returns to Step S706. A silent portion for a predetermined period of time (for example, 1 second) may be detected and used as the break (breakpoint) in sound. In addition, the moving image may not be paused in a section in which there is no break in sound. However, the moving image may be paused at a position where the weight is equal to or greater than a predetermined value. When there is no break in sound, the moving image may be paused such that the user is able to understanding the image.

In Step S716, the moving image control module 170 determines whether the weight is equal to or greater than 2 and less than 5. When the weight is equal to or greater than 2 and less than 5, the process proceeds to Step S724. In the other cases, the process proceeds to Step S718.

In Step S718, the moving image control module 170 determines whether the weight is equal to or greater than 5 and less than 10. When the weight is equal to or greater than 5 and less than 10, the process proceeds to Step S726. In the other cases, the process proceeds to Step S720.

In Step S720, when the weight is equal to or greater than 10, the moving image control module 170 performs a pause. In this case, when there is a resumption instruction from the user, the moving image control module 170 starts reproduction.

In Step S722, the moving image control module 170 determines whether there is a resumption instruction. When there is a resumption instruction, the process returns to Step S704. In the other cases, the moving image control module 170 performs a pause until a resumption instruction is received.

In Step S724, when the weight is equal to or greater than 2 and less than 5, the moving image control module 170 performs a pause for 3 seconds.

In Step S726, when the weight is equal to or greater than 5 and less than 10, the moving image control module 170 performs a pause for 10 seconds.

In the flowchart shown in FIG. 7, the conditions of the weight and the reproduction method are included as an algorithm. However, for example, an algorithm may be used in which a weight and reproduction method correspondence table 800 is used and a process in a reproduction method field 820 is performed when the conditions of a weight field 810 are satisfied. The conditions and the reproduction method in the weight and reproduction method correspondence table 800 may be rewritten to adjust the speed of the reproducing process.

FIG. 8 is a diagram illustrating an example of the data structure of the weight and reproduction method correspondence table 800. The weight and reproduction method correspondence table 800 includes the weight field 810 and the reproduction method field 820. The weight field 810 stores conditions related to the weight. The reproduction method field 820 stores a reproduction method when the conditions are satisfied.

As another reproduction method, slow reproduction may be performed according to the weight or a portion in which the weight is particularly large may be reproduced. In addition, the reproduction method may be independently defined for each user.

FIG. 9 is a diagram illustrating an example of the process (an example of the reproduction process) according to this exemplary embodiment. A case in which the moving image control module 170 controls a process of reproducing the moving image on the basis of a weight table 900 shown in FIG. 9A will be described. FIG. 9A shows a section in which a sound is generated in the moving image. FIG. 9C shows the type of reproduction process performed on the moving image.

A normal reproduction process is performed at the reproduction positions 0 to 2. At the reproduction positions 3 to 4, the normal reproduction process is performed up to a break in sound (at the reproduction position 4). Since the weight of the reproduction position 4 is 2, a pause is performed for 3 seconds at a break in sound. Since the weight of a reproduction position 6 is 4, a pause is performed for 3 seconds at a break in sound. Since the weight of a reproduction position 9 is 9, a pause is performed for 10 seconds at a break in sound. Since the weight of a reproduction position 15 is 2, a pause is performed for 3 seconds at a break in sound. Since the weight of, for example, a reproduction position 10 is 10, but there is no break in sound, no pause is performed. Since the weight of a reproduction position 18 is 12, a pause is performed until an instruction is received from the user. Since the weight of the reproduction positions 20 and 21 is 0.6, fast-forward reproduction is performed.

In this example, the determination process is performed on the basis of the weight value at the break in sound (the end of the sound generation section) and a process of adjusting the reproduction speed is performed on the basis of the determination result. However, the determination process is performed on the basis of the weight value at the beginning of the sound generation section and the process of adjusting the reproduction speed may be performed from the break in sound (the end of the sound generation section) on the basis of the determination result. In addition, the determination process may be performed on the maximum value (or, for example, the average value, the mode value, or the median value) of the weight in the sound generation section and the process of adjusting the reproduction speed may be performed from the break in sound (the end of the sound generation section) on the basis of the determination result.

Whenever the weight varies largely, the reproduction method is changed. Therefore, the weight information management module 120 may perform a weight smoothing process (a process of averaging the weights before and after the reproduction position (the weights before and after a predetermined value)).

In the reproduction process, when there is an operation instruction from the user, the history collection process may also be performed in parallel.

When one user reproduces the same moving image plural times, the weight information management module 120 may perform a weight generating process on history information (history table 400) about a predetermined number of reproduction processes (or plural reproduction processes). For example, the weight generating process may be performed using only history information about the first reproduction process. That is, the weight generating process is not performed in the second reproduction process by the user. The weight generating process may be performed using only history information about the second reproduction process. The weight generating process may be performed using only history information about the last reproduction process. In addition, the weight generating process may be performed using only history information about the first and second reproduction processes. The target may be limited on the basis of the reproduction user ID field 650 of the moving image management table 600. Specifically, when there are plural users with the same user ID in the reproduction user ID field 650, history information (the history table 400 stored in the history table field 660) about a predetermined number of reproduction processes may be used.

FIG. 10 shows the hardware structure of a computer that executes a program according to this exemplary embodiment (the moving image management apparatus 100 and the information processing apparatus 150). The computer is a general computer and is specifically a personal computer or a server. That is, for example, a CPU 1001 is used as a processing unit (arithmetic unit) and a RAM 1002, a ROM 1003, and an HD 1004 are used as storage devices. For example, a hard disk may be used as the HD 1004. The computer includes the CPU 1001 that executes a program to implement the functions of, for example, the moving image request module 155, the moving image display module 160, the weight information selection module 165, the moving image control module 170, the control receiving module 175, the reproduction information recording module 180, the moving image distribution module 110, and the weight information management module 120, the RAM 1002 that stores the program or data, the ROM 1003 that stores, for example, a program for starting the computer, the HD 1004, which is an auxiliary storage device, a receiving device 1006 that receives data on the basis of the operation of the user for a keyboard, a mouse, or a touch panel, an output device 1005, such as a CRT or a liquid crystal display, a communication line interface 1007, such as a network interface card for connection to a communication network, and a bus 1008 that connects the devices for data, communication. Plural computers may be connected to each other by a network.

For a computer program in the above-described exemplary embodiment, the system with this hardware structure reads the computer program, which is software, and the above-described exemplary embodiment is implemented by cooperation between software and hardware resources.

The hardware structure shown in FIG. 10 is an illustrative example, but this exemplary embodiment is not limited to the hardware structure shown in FIG. 10. This exemplary embodiment may have any configuration as long as it may execute the modules described in this exemplary embodiment. For example, some modules may be configured as dedicated hardware components (for example, ASIC) and some modules may be provided in an external system and connected by a communication line. In addition, plural systems shown in FIG. 10 may be connected to each other by a communication line so as to cooperate with each other. In particular, the hardware structure may be incorporated into, for example, an information appliance, a copier, a facsimile, a scanner, a printer, and a multi-function machine (an image processing apparatus having two or more of functions of, for example, a scanner, a printer, a copier, and a facsimile), in addition to the personal computer.

In the above-described exemplary embodiment, the terms "equal to or greater than a predetermined value", "equal to or less than a predetermined value", "greater than a predetermined value", and "less than a predetermined value" may be similar in meaning to the term "greater than a predetermined value", "less than a predetermined value", "equal to or greater than a predetermined value", and "equal to or less than a predetermined value", respectively, as long as combinations therebetween are not contradictory to each other.

The above-mentioned program may be stored in a recording medium and then provided. In addition, the above-mentioned program may be provided by a communication unit. In this case, for example, the above-mentioned program may be understood as the invention of a "computer-readable recording medium having a program recorded thereon".

The "computer-readable recording medium having a program recorded thereon" refers to a computer-readable recording medium having a program recorded thereon which is used to, for example, install, execute, and distribute the program.

Examples of the recording medium may include digital versatile discs (DVDs), such as "DVR-R, DVD-RW, and DVD-RAM" which are the standards defined by the DVD Forum, and "DVD+R and DVD+RW" which are the standards defined by DVD+RW, compact discs (CDs), such as a read-only memory (CD-ROM), CD recordable (CD-R), and CD rewritable (CD-RW), a blue-ray disc (registered trademark), a magneto-optical disc (MO), a flexible disk (FD), a magnetic tape, a hard disk, a read only memory (ROM), an electrically erasable programmable read-only memory (EEPROM (registered trademark)), a flash memory, a random access memory (RAM), and an SD (Secure Digital) memory card.

The program or a part thereof may be recorded and stored in the recording medium and then distributed. In addition, the program or a part thereof may be transmitted by communication using transmission media, such as wired networks including a local area network (LAN), a metropolitan area network (MAN), a wide area network (WAN), the Internet, an intranet, and an extranet, wireless networks, and combinations thereof. In addition, the program or a part thereof may be transmitted using carrier waves.

The program may be a part of another program, or it may be recorded on the recording medium along with a separate program. In addition, the program may be divided and recorded on plural recording media. In addition, the program may be recorded in any form including, for example, compression and encryption as long as it may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners stilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first information processing apparatus;
a second information processing apparatus; and
a third information processing apparatus,
wherein the first information processing apparatus includes:
a first reproducing unit that performs a process of reproducing a moving image, the moving image being a recording or synthesis of a sequence of image frames that form a moving picture;
a first receiving unit that receives an operation related to the moving image which is reproduced by the first reproducing unit;
a first control unit that controls the moving image reproduction process of the first reproducing unit on the basis of the operation received by the first receiving unit;
a first recording unit that records a time elapsed from the start of the moving image reproduction process of the first reproducing unit and a reproduction position in the moving image by the reproduction process controlled by the first control unit so as to correspond to each other; and
a first transmitting unit that transmits the recording result of the first recording unit to the second information processing apparatus,
the second information processing apparatus includes:
a second receiving unit that receives the recording result transmitted by the first transmitting unit of the first information processing apparatus;
a second generating unit that generates a variable for adjusting a reproduction speed of the moving image, on the basis of the recording result which is obtained by performing the reproduction process on the same moving image a plurality of times and is received by the second receiving unit; and
a second transmitting unit that transmits the variable generated by the second generating unit to the third information processing apparatus, and
the third information processing apparatus includes:
a third receiving unit that receives the variable transmitted by the second transmitting unit of the second information processing apparatus;
a third reproducing unit that performs a process of reproducing the moving image; and
a third control unit that controls the moving image reproduction process of the third reproducing unit on the basis of the variable received by the third receiving unit.

2. An information processing apparatus comprising:
a reproducing unit that performs a process of reproducing a moving image, the moving image being a recording or synthesis of a sequence of image frames that form a moving picture; and
a control unit that controls a speed of the moving image reproduction process of the reproducing unit, on the basis of a variable generated on the basis of the recording result which is obtained by performing the reproduction process on the same moving image a plurality of times and in which a time elapsed from the start of the moving image reproduction process and a reproduction position in the moving image by the reproduction process are recorded so as to correspond to each other.

3. An information processing apparatus comprising:
a reproducing unit that performs a process of reproducing a moving image, the moving image being a recording or synthesis of a sequence of image frames that from a moving picture;
a receiving unit that receives an operation related to the moving image which is reproduced by the reproducing unit;

a control unit that controls the moving image reproduction process of the reproducing unit on the basis of the operation received by the receiving unit; and a recording unit that records a time elapsed from the start of the moving image reproduction process of the reproducing unit and a reproduction position in the moving image by the reproduction process controlled by the control unit so as to correspond to each other, wherein the control unit controls the moving image reproduction process of the reproducing unit, on the basis of a variable which is generated on the basis of the recording result of the recording unit obtained by performing the reproduction process on the same moving image a plurality of times and is for adjusting a reproduction speed of the moving image.

4. The information processing apparatus according to claim 2, wherein the control unit adjusts the reproduction speed at a break in sound in the moving image.

5. The information processing apparatus according to claim 3, wherein the control unit adjusts the reproduction speed at a break in sound in the moving image.

6. The information processing apparatus according to claim 4, wherein the control unit adjusts a speed of the reproduction process at a break in sound in the moving image.

7. The information processing apparatus according to claim 5, wherein the control unit adjusts a speed of the reproduction process at a break in sound in the moving image.

8. The information processing apparatus according to claim 3, wherein, when the variable is equal to or greater than a predetermined value, the control unit adjusts a speed of the reproduction process even though there is no break in sound in the moving image.

9. The information processing apparatus according to claim 4, wherein, when the variable is equal to or greater than a predetermined value, the control unit adjusts a speed of the reproduction process even though there is no break in sound in the moving image.

10. The information processing apparatus according to claim 5, wherein, when the variable is equal to or greater than a predetermined value, the control unit adjusts a speed of the reproduction process even though there is no break in sound in the moving image.

11. The information processing apparatus according to claim 6, wherein, when the variable is equal to or greater than a predetermined value, the control unit adjusts a speed of the reproduction process even though there is no break in sound in the moving image.

12. The information processing apparatus according to claim 3, wherein, when the operation received by the receiving unit is a pause and the pause time is equal to or more than a predetermined value, the recording unit does not perform recording during the pause or does not perform a variable generating process to the pause time as the variable.

13. The information processing apparatus according to claim 7, wherein, when the variable is equal to or greater than a predetermined value, the control unit adjusts a speed of the reproduction process even though there is no break in sound in the moving image.

14. The information processing apparatus according to claim 2, wherein a smoothing process is performed using the variables before and after the reproduction position.

15. The information processing apparatus according to claim 3, wherein a smoothing process is performed using the variables before and after the reproduction position.

16. The information processing apparatus according to claim 4, wherein a smoothing process is performed using the variables before and after the reproduction position.

17. The information processing apparatus according to claim 5, wherein a smoothing process is performed using the variables before and after the reproduction position.

18. The information processing apparatus according to claim 6, wherein a smoothing process is performed using the variables before and after the reproduction position.

19. A non-transitory computer readable medium storing an information processing program that causes a computer to function as:

a reproducing unit that performs a process of reproducing a moving image, the moving image being a recording or synthesis of a sequence of image frames that form a moving picture; and a control unit that controls a speed of the moving image reproduction process of the reproducing unit, on the basis of a variable generated on the basis of the recording result which is obtained by performing the reproduction process on the same moving image a plurality of times and in which a time elapsed from the start of the moving image reproduction process and a reproduction position in the moving image by the reproduction process are recorded so as to correspond to each other.

20. A non-transitory computer readable medium storing an information processing program that causes a computer to function as:

a reproducing unit that performs a process of reproducing a moving image, the moving image being a recording or synthesis of a sequence of image frames that form a moving picture;

a receiving unit that receives an operation related to the moving image which is reproduced by the reproducing unit;

a control unit that controls the moving image reproduction process of the reproducing unit on the basis of the operation received by the receiving unit; and a recording unit that records a time elapsed from the start of the moving image reproduction process of the reproducing unit and a reproduction position in the moving image by the reproduction process controlled by the control unit so as to correspond to each other, wherein the control unit controls the moving image reproduction process of the reproducing unit, on the basis of a variable which is generated on the basis of the recording result of the recording unit obtained by performing the reproduction process on the same moving image a plurality of times and is for adjusting a reproduction speed of the moving image.

* * * * *